Nov. 1, 1932. J. M. TUTEN 1,885,392
AEROPLANE
Filed June 5, 1931 5 Sheets-Sheet 4
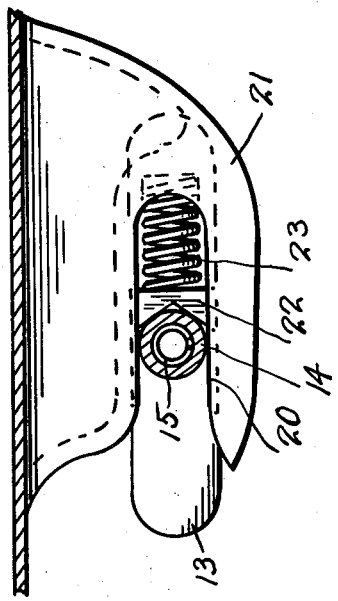
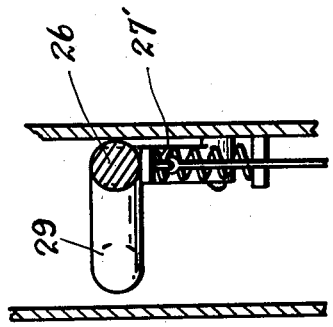
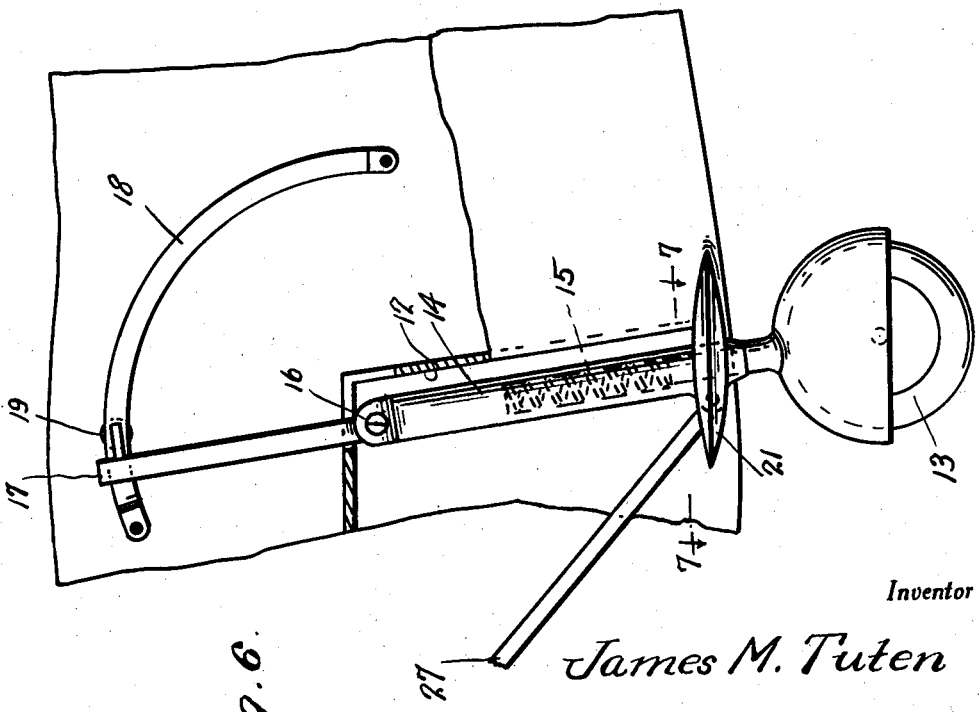
Inventor
James M. Tuten
By Clarence A. O'Brien
Attorney Nov. 1, 1932. J. M. TUTEN 1,885,392
AEROPLANE
Filed June 5, 1931 5 Sheets-Sheet 5
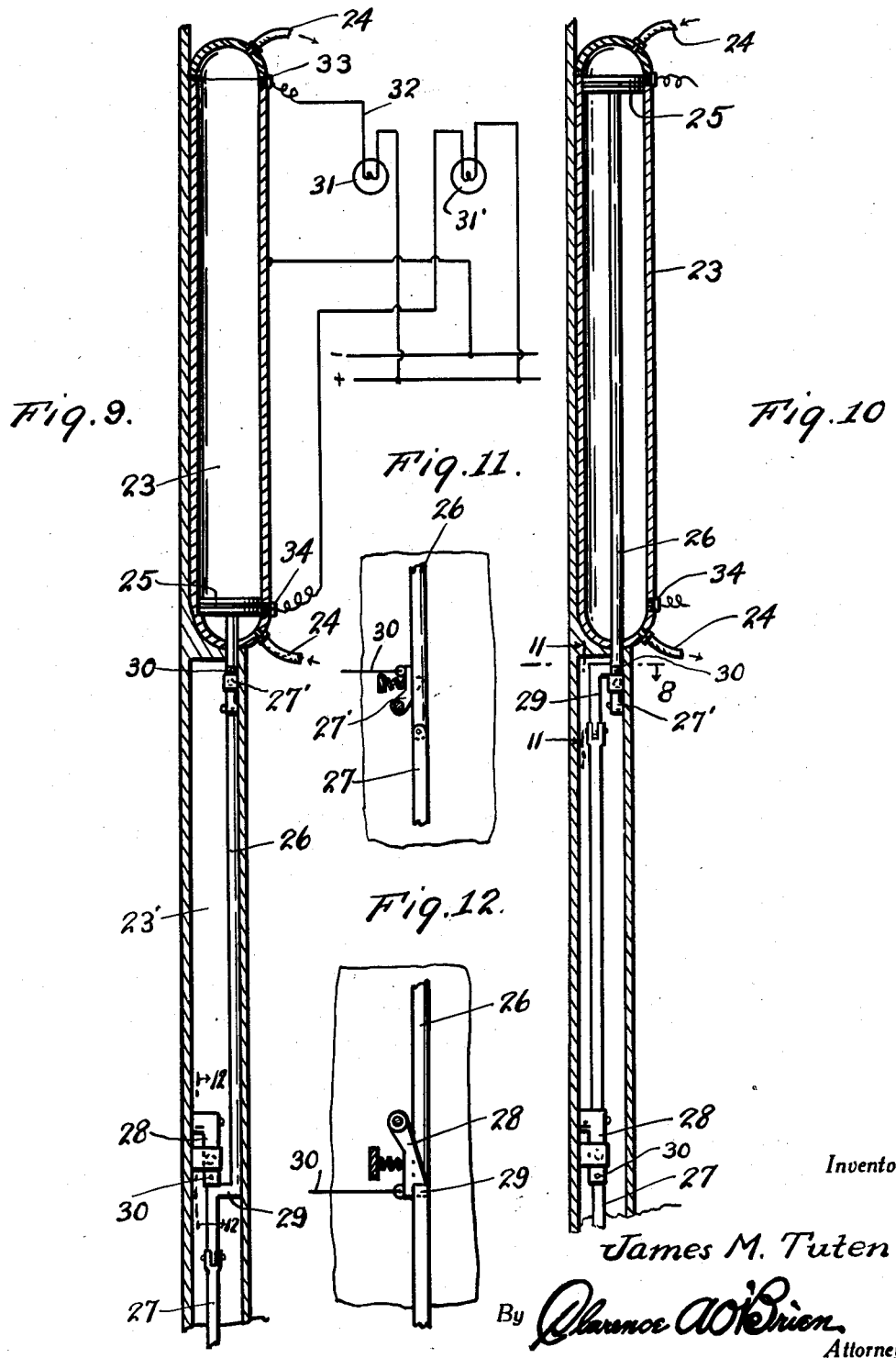
Inventor
James M. Tuten
By Clarence A. O'Brien
Attorney Patented Nov. 1, 1932

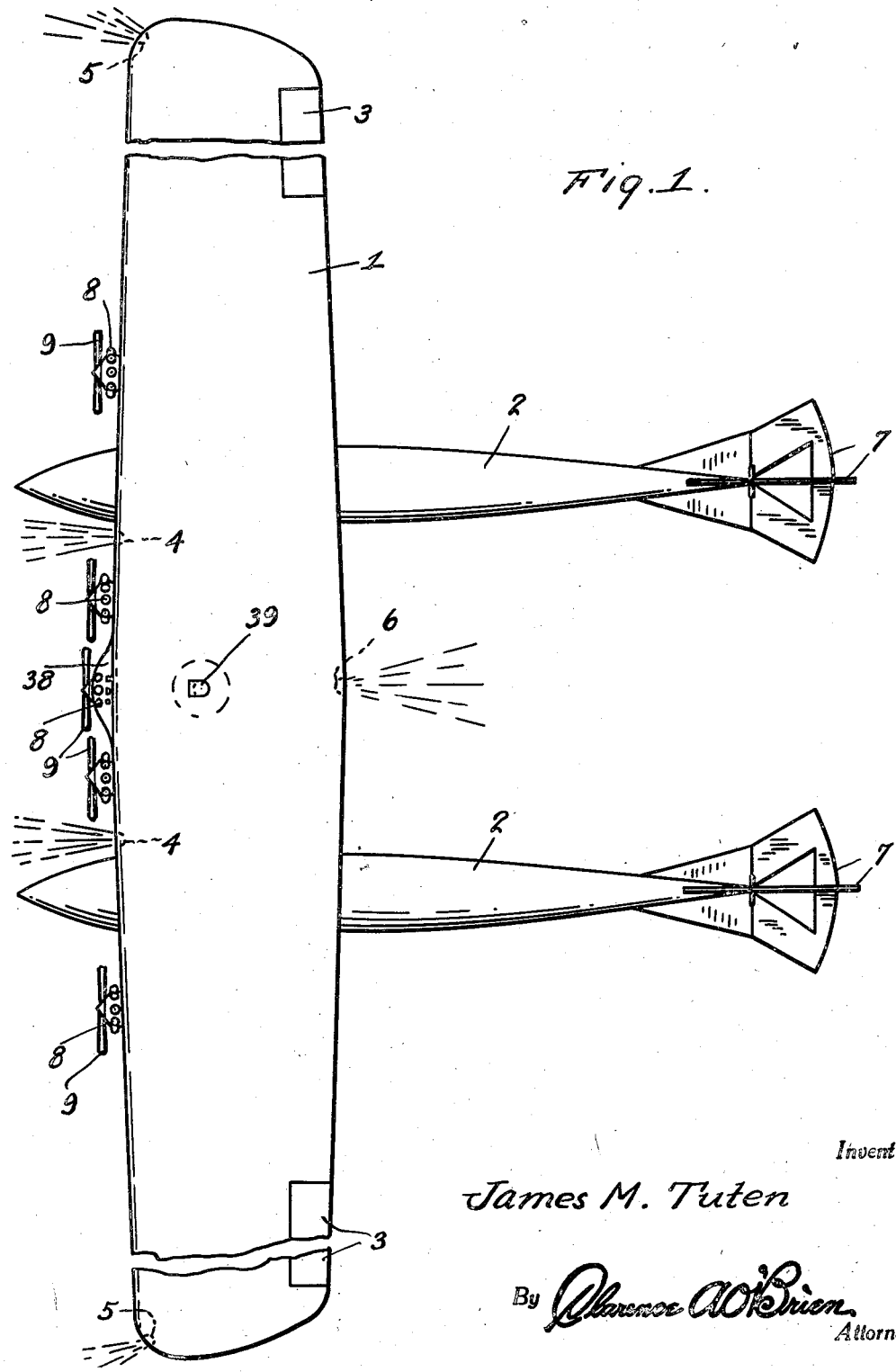

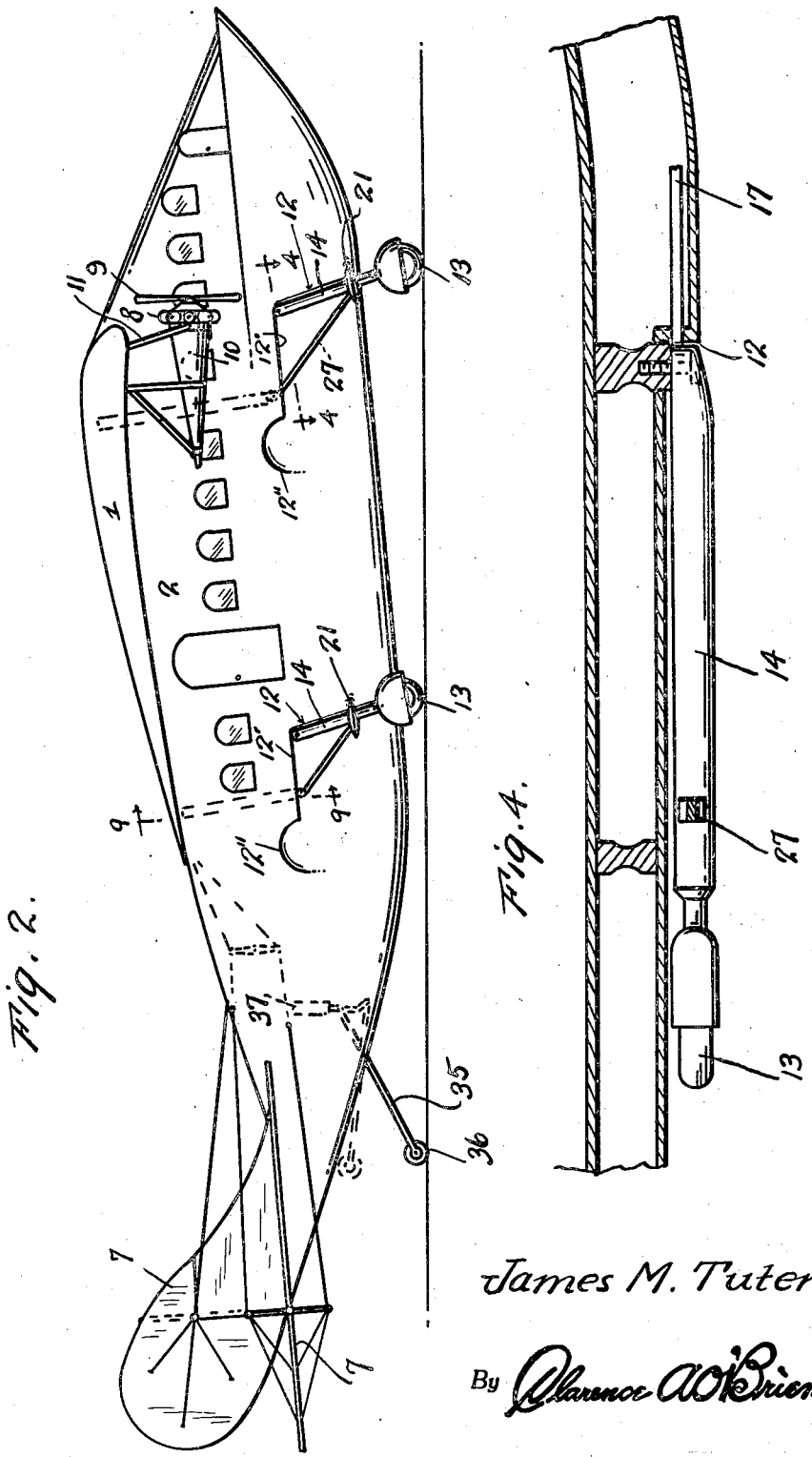

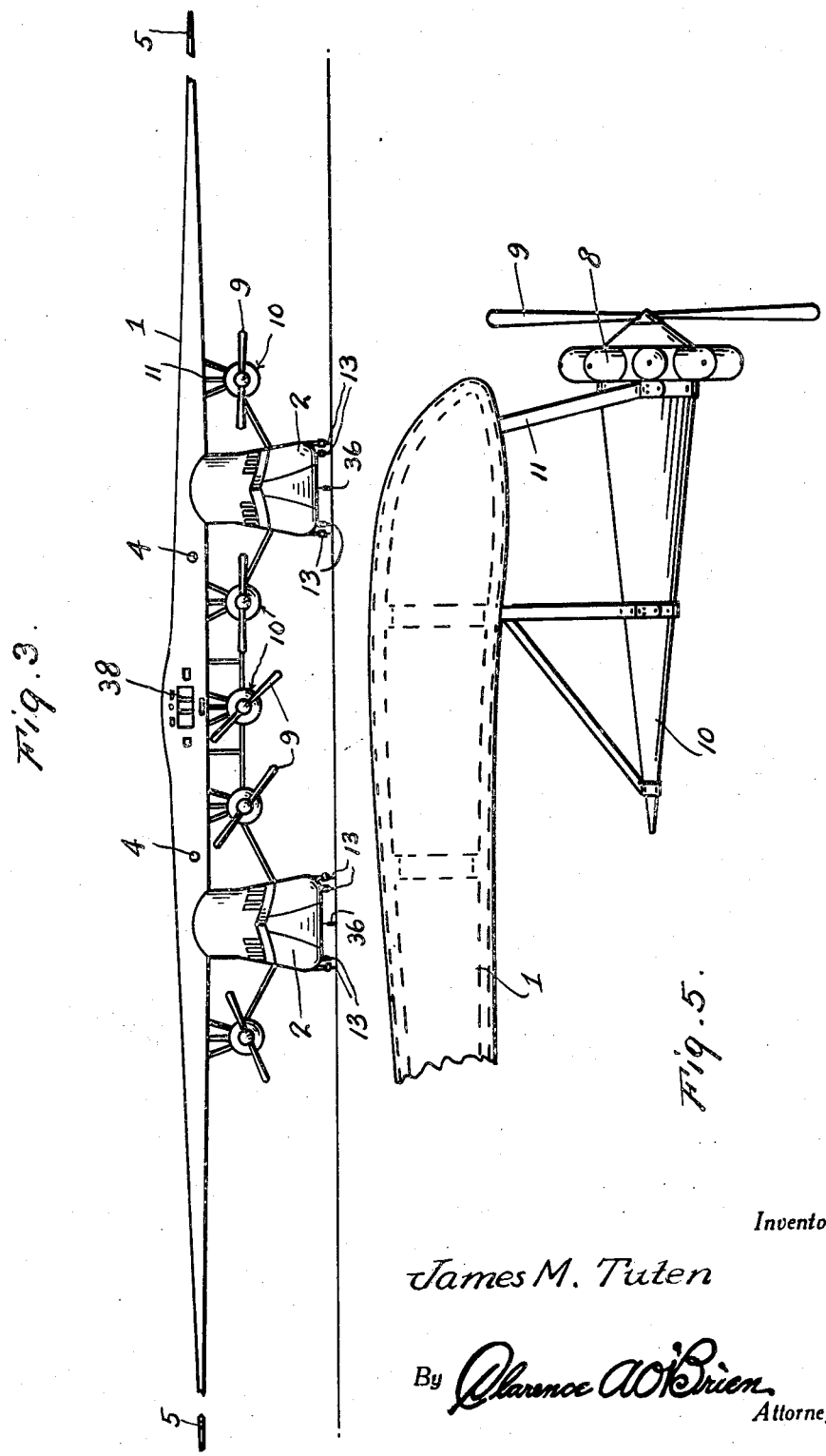

1,885,392

UNITED STATES PATENT OFFICE

JAMES M. TUTEN, OF HOPEDALE, MASSACHUSETTS

AEROPLANE

Application filed June 5, 1931. Serial No. 542,408.

This invention relates to an aeroplane which can land on water or the ground and of the monoplane type, the general object of the invention being to provide a plane of this type of large size so that it has great carrying capacity and so formed as to have the maximum safety and high speed with the retractible landing gear so that the gear can be raised into the bodies of the plane when landing in water or when the ship is in flight so that such gear will not tend to reduce the speed of the ship through resistance to the wind.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a top plan view of the invention.
Fig. 2 is an elevation thereof.
Fig. 3 is a front view.
Fig. 4 is a section on the line 4—4 of Fig. 2.
Fig. 5 is a fragmentary view showing one end of the wing and the motor assembly.
Fig. 6 is a fragmentary elevation partly in section showing one of the wheel assemblies.
Fig. 7 is a section on the line 7—7 of Fig. 6.
Fig. 8 is a section on the line 8—8 of Fig. 10.
Fig. 9 is a section on approximately the line 9—9 of Fig. 2.
Fig. 10 is a similar view but showing the parts in raised position.
Fig. 11 is a section on the line 11—11 of Fig. 10.
Fig. 12 is a section taken on line 12—12 of Fig. 9.
In these drawings, the numeral 1 indicates the wing and the numeral 2 indicates the two fuselages which are spaced one on each side of the center of the wing, as shown in Fig. 1. The wing is provided with the usual ailerons 3 and the wing is also provided with the headlights 4, the running lights 5 and the tail light 6. Each fuselage is also provided with the vertical and horizontal rudders 7 at its tail end which are controlled in any suitable manner from the cockpit or pilot's space of the plane.

As shown in Fig. 2, each fuselage is of the cabin type and its lower part is of boat-shape so that the plane can readily float on a body of water and the fuselage is also shaped to offer the minimum resistance to the passage of the plane through the air.

The engines or motors 8 for the propellers 9 are preferably of the air-cooled type and each engine is provided with a conical cowling 10. suspended under the wing by the members 11. The cowling 10 contains the starter means, the magneto, the generator etc.

Recesses are formed in the sides of each fuselage for receiving the landing gear when the same is retracted. Each recess has a front wall 12 and a top wall 12', the top wall terminating in a pocket 12'' for the wheel 13. Each wheel is carried by a strut 14 of the shock absorbing type, the spring being shown at 15 and this strut is pivoted at its upper end in the top part of the recess adjacent the front wall as shown at 16, and has an extension 17 on its upper end, the upper end of which operates over an arc-shaped guide 18 which has a latch 19 at its upper end for engaging the upper end of the extension 17, when the wheel is in landing position so as to lock the parts with the wheel in this position. The latch is retracted by the pilot or another operator by suitable means such as a pull cord or cable leads to a suitable part of the ship.

When the wheel is moving to landing position, the lower end of the member 14 will enter a slot 20, in a member 21 of tapered shape which extends outwardly from the side of the fuselage at the lower end of wall 12, and this member 21 carries the bumper consisting of a block 22 and a spring 23, the block having a V-shaped recess therein to receive a part of the member 14. Thus this bumper absorbs the shock of the member 14 as the same is swung downwardly into landing position.

Each wheel assembly is moved to retracted and projected position by pressure means which consists of a cylinder 23 having its ends connected by the pipes 24 with a suitable source of compressed fluid preferably air. A piston 25 is arranged in this cylinder and the piston rod 26 passes through the lower end of the cylinder and the lower end of this rod is connected by a link 27, to the lower part of the member 14, so that when air is introduced into the lower end of the cylinder the piston will raise and move the wheel assembly into the recess and when fluid is introduced into the top of the cylinder, the piston will be lowered so that the wheel assembly will be projected to enable the craft to land on the ground. The piston rod and link 27 operates in a vertically arranged chamber 23' formed in a side of the fuselage and having its lower end opening but through the wall 12'. When the landing gear is projected, the link 27 will be moved out of the chamber, but when the gear is raised, the link will move into the chamber. The pivoted end of member 14 is beveled so as to offer no resistance to the air when raised as shown in Fig. 4.

A spring latch 27' is provided for holding the parts with the wheels retracted and a spring latch 28 is also provided for holding the parts with the wheels projected. These latches engage a bent part 29 at the lower end of the piston rod and they are moved to releasing position by a pull cord or cable 30.

I also provide signal lamps 31 for indicating when the wheels are in raised or lowered position, the circuits 32 of the lamp being closed by the piston 25. For instance when the piston 25 is in raised position, it will engage a terminal 35 connected with the lamp 31, and the circuit of this lamp will be closed to indicate that the wheels are retracted. When the piston 25 is in lowered position, the lamp 31' will be lighted to indicate that the wheels are projected.

The carrier 35 for the rear wheel 36 is also raised and lowered in the same manner and the cylinder of the said means being shown at 37. The pilot's room or house is placed in the front part of the central portion of the wing as shown at 38 with the window therein formed in the front of the central part of the wing and the gas tank is filled through an opening 39 placed in the top of the wing at the center thereof.

From the foregoing, it will be seen that I have provided an aeroplane of the maximum carrying capacity, and of the maximum safety, with twin hulls or fuselages spaced far enough apart from the front of the wing to assure equal distribution of the weight without undue strain or unnecessary bracing which results from a central location.

The landing gears can be retracted so that the craft can land on water and by retracting the gears while flying, such gears will offer no resistance to the passage of the craft thru the air. The hulls are formed with stream lines so as to offer but little resistance to the passage of the craft through the air and the stream like recesses for receiving the wing assembly also reduce air resistance.

The hulls are provided with bulk heads to make the device buoyant and prevent it from sinking if the ship should land in water, even though some of the bulk heads should leak. The controls are also preferably operated by compressed air and can be operated by hand in emergency.

The hulls are formed with living quarters, storage spaces, etc., and are fitted in accordance with the use to which the craft is to be put.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

An aircraft of the class described comprising a fuselage, pockets formed in the fuselage, a wheel carrying member pivoted in each pocket, a cylinder, a piston therein, means for connecting each piston with a wheel carrying member, means for introducing compressed fluid into the ends of the cylinder for swinging the wheel carrying member into and out of the pocket, latch means for holding the wheel carrying member in retracted position, latch means for holding the wheel carrying member in projected position, means for moving the latch means to releasing position, an extension member on the upper end of the wheel carrying member, a guide for the upper end of said extension, and a latch on the guide for engaging the extension when the wheel carrying member is in projected position.

In testimony whereof I affix my signature.

JAMES M. TUTEN.